United States Patent Office 2,827,498
Patented Mar. 18, 1958

2,827,498

CONVERSION OF GEOMETRICAL ISOMERS OF MENTHOL TO RACEMIC MENTHOL BY SILICA CATALYSTS

Robert R. Bottoms, Crestwood, Ky., assignor to National Cylinder Gas Company, Chicago, Ill., a corporation of Delaware No Drawing. Application May 27, 1957
Serial No. 661,599

9 Claims. (Cl. 260—631)

This invention relates to a method of converting geometrical isomers of menthol to racemic menthol. More particularly this invention relates to a method of converting geometrical isomers of menthol to racemic menthol by reaction isomerization at elevated temperature in the presence of silica.

This application is a continuation-in-part of my co-pending application Serial No. 489,761, filed February 21, 1955, and now abandoned.

In the synthesis of menthol from such intermediates as menthone, thymol and pulegone, there is formed not only menthol which has the following graphic formula

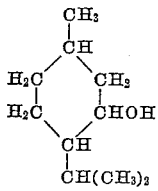

but also geometrical isomers of menthol, namely, neomenthol, isomenthol, and isoneomenthol. These geometrical isomers of menthol have the same empirical and graphic formulas as menthol and exhibit essentially the same chemical properties, although they differ in their physical properties. Racemic menthol is the only product of any commercial value since it can be converted to natural l-menthol by resolution procedures. The geometrical isomers of racemic menthol have no commercial value and it is therefore highly desirable that these by-products of the synthesis of menthol be converted into useful materials.

It is the object of this invention to provide a method for converting geometrical isomers of menthol to racemic menthol. It is another object of this invention to provide a method for converting the undesirable geometrical isomers of menthol which are produced in menthol syntheses into useful materials. It is a further object to increase the yields of menthol in commercial syntheses from thymol, menthone, pulegone and piperitone. Other objects of this invention will be apparent from the following disclosure.

It has been known that geometrical isomers of menthol may be partially converted to racemic menthol by prolonged heating with alkaline reagents such as alkali metal menthoxides or alkaline-earth metal menthoxides. By the present invention it has been discovered that geometrical isomers of menthol may be converted in high yield to racemic menthol by heating with a catalytic quantity of finely divided silica, $SiO_2$, or materials which are convertible to silica upon heating. The racemic menthol so formed may then be isolated by fractional distillation or by fractional crystallization or by combinations thereof in the conventional manner employed in the prior art. The geometrical isomers of menthol which are not converted to racemic menthol may then be retreated in the same manner for the production of further quantities of racemic menthol. In this way it is possible to convert geometrical isomers of menthol to racemic menthol with very little loss of material. This highly efficient method contrasts with the prior art methods used heretofore for the conversion of the geometrical isomers of menthol to racemic menthol. By such procedures, the sodium, potassium or other alkali or alkaline-earth metal derivatives of the geometrical isomers of menthol are prepared and then these materials on prolonged heating for periods of 24 hours or more at high temperatures in the range of 200° to 210° C. are partially isomerized to dl-menthol. After the heating period it is necessary to treat the reaction mixture with water or dilute acid to remove the alkali or alkaline-earth metals, and thereafter the reaction mixture is fractionated to separate the desired dl-menthol. In the prior art process, about 20% of the isomers were converted to menthol at each treatment.

The process of the present invention has the important advantage that the catalyst for the isomerization is readily separated from the reaction product by simple sedimentation and can be reused for subsequent runs. Other important advantages are: (1) a larger proportion of the isomeric menthols is converted to racemic menthol in each treatment; (2) a shorter period of heating may be used; and (3) the catalyst for the conversion is an inexpensive, readily available material. All of these factors result in a vastly more economical method of producing racemic menthol from mixtures of geometrical isomers of menthol.

Broadly, the invention is carried out by heating a geometrical isomer of menthol or a mixture of geometrical isomers of menthol with finely divided silica for a period of time ranging from one to three hours to as long as twelve to fifteen hours, at a temperature above 150° C. and preferably in the range of 180° to 200° C. Temperatures above 210° C. are to be avoided because of decomposition of the menthol. The amount of silica used in the methods can be relatively small since the silica is a catalyst and is not consumed, destroyed or inactivated during reaction. Generally, 1% to 3% of silica based upon the weight of geometrical isomers of menthol used has been found to be satisfactory, although obviously larger amounts may be successfully employed. The silica may be any of the common forms of $SiO_2$ such as micro crystalline silica mined in Arkansas and sold under the trademark Novocite. Finely ground silica sand, diatomaceous earth, kieselguhr, pulverized silica gel, fuller's earth and like silica-containing materials are suitable catalysts. Hydrates of silica such as the silicic acids and silica hydrogels are also operative. Of the above, preferred catalysts include ground silica sand or micro crystalline mined silica, although the other materials are equally effective.

In the actual operation of the process a charge of liquid geometrical isomers of menthol is agitated and the catalytic amount of silica is dispersed therein. It is desirable that the catalyst be in intimate contact with the menthol isomers, and this is best achieved by mechanical agitation. The mixture is heated to about 190° C., continuous agitation being maintained. After the mixture has been agitated and heated for the appropriate period of time, the reaction mixture is allowed to cool and the sediment of silica is removed by decantation. The mixture of menthol and menthol isomers is then subjected to fractional distillation. The menthol distilling at a higher temperature than its geometrical isomers. If desired, the racemic menthol can be obtained in a high state of purity by crystallization procedures.

The following example illustrates one embodiment of the invention, but it is to be understood that the invention is not to be limited thereto. It will be apparent to those skilled in the art that many modifications in the conditions and amounts of materials may be made without departing from the scope of the invention. Relative amounts of materials are given in parts by weight and temperatures are given in degrees centigrade.

*Example*

Two thousand parts of a mixture of geometrical isomers of menthol is placed in a still and agitated with a revolving agitator. Twenty parts of finely pulverized silica sand is added and the mixture is heated with continuous agitation at 190° C. for a period of eight hours. The agitation and heating are then discontinued and the catalyst allowed to settle while the reaction mixture is cooling. The clear organic liquid is decanted from the catalyst and transferred to another still and distilled under reduced pressure through an efficient fractionating column. The first cut obtained in the temperature range of 100° to 105° C. at 15 millimeters pressure consists largely of the more liquid menthol isomers. This cut generally comprises about 50% of the charge. A second cut distilling at 105° to 107° C. at 15 millimeters pressure is then collected. This fraction comprises about 50% of the charge and consists largely of racemic menthol. The latter may then be chilled to induce crystallization and the crystallized material is centrifuged to obtain high purity crystalline menthol. The yield of such crystalline material is about 40% of the amount of geometrical isomers of menthol used.

The first cut of geometrical menthol isomers is then returned to the first still containing the finely pulverized silica sand and further agitated and heated at 190° C. By continuing the isomerization in this fashion it is possible to convert at least 85% of the geometrical isomers of menthol to crystalline racemic menthol.

What is claimed as new and desired to be secured by Letters Patent of the United States is:

1. A method of converting a geometrical isomer of menthol to menthol which comprises heating said geometrical isomer of menthol with a silica-containing material at a temperature not greater than about 210° C.

2. A method of converting a geometrical isomer of menthol to menthol which comprises heating said geometrical isomer of menthol with silica at a temperature not greater than about 210° C.

3. A method of converting a geometrical isomer of menthol to menthol which comprises heating said geometrical isomer of menthol with a silica-containing material at a temperature in the range of about 150° C. to about 210° C.

4. A method of converting a geometrical isomer of menthol to menthol which comprises heating said geometrical isomer of menthol with finely divided silica at a temperature above about 150° C. but not greater than about 210° C. and separating the racemic menthol thus formed.

5. A method of converting a geometrical isomer of menthol to menthol which comprises heating said geometrical isomer of menthol with finely divided silica at a temperature in the range of about 180° C. to about 200° C. and separating the racemic menthol thus formed.

6. A method of converting a geometrical isomer of menthol to menthol which comprises heating said geometrical isomer of menthol with finely divided silica at a temperature in the range of about 180° C. to about 200° C. and separating the racemic menthol thus formed by fractional distillation.

7. A method of converting a geometrical isomer of menthol to menthol which comprises heating said geometrical isomer of menthol with finely divided silica at a temperature in the range of 180° C. to 200° C. and separating the racemic menthol thus formed by fractional distillation and by fractional crystallization.

8. A method of converting racemic neomenthol to racemic menthol which comprises heating neomenthol with finely ground silica sand at a temperature in the range of 180° C. to 200° C. and separating the racemic menthol thus formed by fractional distillation and by fractional crystallization.

9. The method of converting racemic isomenthol to racemic menthol which comprises heating isomenthol with finely ground silica sand at a temperature in the range of 180° C. to 200° C. and separating the racemic menthol thus formed by fractional distillation and by fractional crystallization.

No references cited.